US012057064B2

(12) United States Patent
Wang et al.

(10) Patent No.: US 12,057,064 B2
(45) Date of Patent: Aug. 6, 2024

(54) PIXEL CIRCUIT, DRIVING METHOD THEREOF AND DISPLAY DEVICE

(71) Applicants: Beijing BOE Technology Development Co., Ltd., Beijing (CN); BOE Technology Group Co., Ltd., Beijing (CN)

(72) Inventors: Zhiliang Wang, Beijing (CN); Dawei Tang, Beijing (CN)

(73) Assignees: BEIJING BOE TECHNOLOGY DEVELOPMENT CO., LTD., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 250 days.

(21) Appl. No.: 17/352,603

(22) Filed: Jun. 21, 2021

(65) Prior Publication Data

US 2022/0165212 A1 May 26, 2022

(30) Foreign Application Priority Data

Nov. 24, 2020 (CN) ......................... 202011326670.4

(51) Int. Cl.
*G09G 3/3233* (2016.01)
*G09G 3/32* (2016.01)

(52) U.S. Cl.
CPC ............. *G09G 3/3233* (2013.01); *G09G 3/32* (2013.01); *G09G 2300/0842* (2013.01)

(58) Field of Classification Search
CPC .................. G09G 3/3233; G09G 3/32; G09G 2300/0842; G09G 2320/0204; G09G 2300/0819
See application file for complete search history.

(56) References Cited

FOREIGN PATENT DOCUMENTS

| | | | |
|---|---|---|---|
| CN | 103035198 | A | 4/2013 |
| CN | 103354077 | A | 10/2013 |
| CN | 103886838 | A | 6/2014 |
| CN | 106935201 | A | 7/2017 |
| CN | 111540315 | A | 8/2020 |

*Primary Examiner* — Julie Anne Watko
(74) *Attorney, Agent, or Firm* — Workman Nydegger

(57) ABSTRACT

The present disclosure can provide a pixel circuit, a driving method thereof and a display device. By arranging a data write circuit, a driving control circuit, a light-emitting control circuit and a light-emitting device, the data write circuit provides a data signal of the data signal end for the driving control circuit in response to a signal of a first scanning signal end; the driving control circuit generates a driving current according to the data signal; and the light-emitting control circuit connects the driving control circuit with a cathode of the light-emitting device in response to a signal of a second scanning signal end, so that the driving current is input into the light-emitting device to control the light-emitting device to emit light. Besides, a voltage of the first power end is larger than that of the second power end.

12 Claims, 9 Drawing Sheets

PIXEL CIRCUIT, DRIVING METHOD THEREOF AND DISPLAY DEVICE

CROSS-REFERENCE TO RELATED ART

The present application is based on and claims priority under 35 U.S.C. 119 to Chinese Patent Application No. 202011326670.4, filed on Nov. 24, 2020, in the China National Intellectual Property Administration, the entire contents of which are incorporated herein by reference.

FIELD

The present disclosure relates to the field of display, in particular to a pixel circuit, a driving method thereof and a display device.

BACKGROUND

Electroluminescent diodes, such as an Organic Light Emitting Diode (OLED), Quantum Dot Light Emitting Diodes (QLED), etc. have the advantages of being self-luminous, low in energy consumption, etc. and become one of hot spots in the field of application research of electroluminescent display devices at present. Generally, in an electroluminescent display device, a pixel circuit is adopted to drive an electroluminescent diode to emit light.

SUMMARY

An embodiment of the present disclosure provides a pixel circuit, including: a data write circuit, a driving control circuit, a light-emitting control circuit and a light-emitting device. An anode of the light-emitting device is electrically connected with a first power end, and a cathode of the light-emitting device is electrically connected with a second power end through the light-emitting control circuit and the driving control circuit in sequence; a voltage of the first power end is larger than a voltage of the second power end;

the data write circuit is configured to provide a data signal of a data signal end for the driving control circuit in response to a signal of a first scanning signal end;

the driving control circuit is configured to generate a driving current according to the data signal; and the light-emitting control circuit is configured to connect the driving control circuit with the cathode of the light-emitting device in response to a signal of a second scanning signal end, so that the driving current is input into the light-emitting device to control the light-emitting device to emit light.

An embodiment of the present disclosure further provides a display device, including the pixel circuit mentioned above.

An embodiment of the present disclosure further provides a driving method of a pixel circuit, including a data write stage and a light-emitting stage;

in the data write stage, a data write circuit provides a data signal of a data signal end for a driving control circuit in response to a signal of a first scanning signal end; and in the light-emitting stage, the driving control circuit generates a driving current according to the data signal; and a light-emitting control circuit connects the driving control circuit with a cathode of a light-emitting device in response to a signal of a second scanning signal end, so that the driving current is input into the light-emitting device to control the light-emitting device to emit light.

DETAILED DESCRIPTION OF THE EMBODIMENTS

Figure 1:
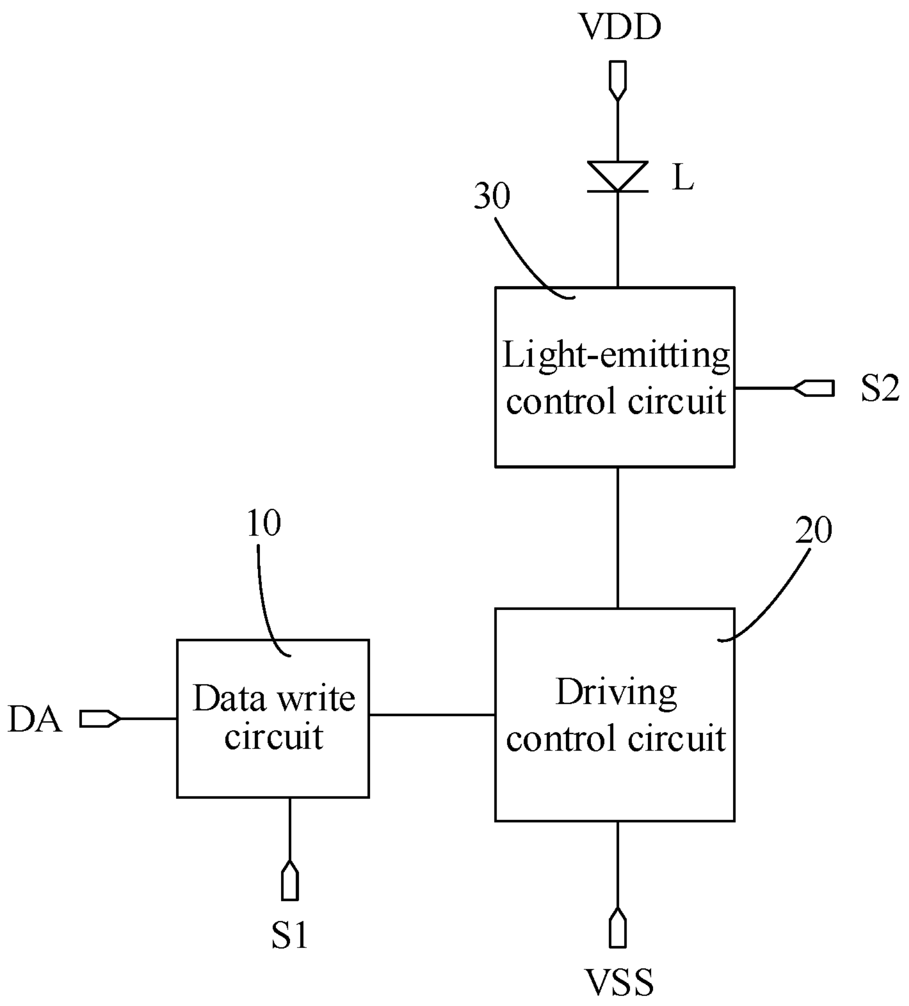
FIG. 1 is a schematic structural diagram of a pixel circuit in an embodiment of the present disclosure.

In order to make objectives, technical solutions and advantages of embodiments of the present disclosure clearer, the technical solutions of the embodiments of the present disclosure will be clearly and fully described in combination with the accompanying drawings of the embodiments of the present disclosure. Apparently, the described embodiments are only some, but not all of the embodiments of the present disclosure. Under the condition of no conflict, the embodiments and features in the embodiments in the present disclosure may be combined mutually. Based on the described embodiments of the present disclosure, all other embodiments obtained by those ordinarily skilled in the art without creative work belong to the protection scope of the present disclosure.

Unless otherwise defined, technical or scientific terms used herein should be understood commonly by those ordinarily skilled in the art of the present disclosure. “First”, “second” and other similar words used in the present disclosure do not denote any sequence, quantity or significance, but are only used for distinguishing different components. “Include”, “contain” and other similar words mean that elements or items preceding the word cover elements or items and their equivalents listed after the word without excluding other elements or items. “Connection” or “joint” and other similar words are not limited to physical or mechanical connection, but may include electrical connection in spite of being direct or indirect.

It should be noted that sizes and shapes of all figures in the drawings do not reflect a true scale and are only intended to illustrate contents of the present disclosure. Same or similar reference numbers throughout denote same or similar elements or elements with same or similar function.

An embodiment of the present disclosure provides a pixel circuit, as shown in FIG. 1, including: a data write circuit 10, a driving control circuit 20, a light-emitting control circuit 30 and a light-emitting device L. Here, an anode of the light-emitting device L is electrically connected with a first power end VDD, a cathode of the light-emitting device L is electrically connected with a second power end VSS through the light-emitting control circuit 30 and the driving control circuit 20 in sequence; a voltage of the first power end VDD is larger than that of the second power end VSS;

- the data write circuit 10 is configured to provide a data signal of a data signal end DA for the driving control circuit 20 in response to a signal of a first scanning signal end S1;
- the driving control circuit 20 is configured to generate a driving current according to the data signal; and
- the light-emitting control circuit 30 is configured to connect the driving control circuit 20 with the cathode of the light-emitting device L in response to a signal of a second scanning signal end S2, so that the driving current is input into the light-emitting device L to control the light-emitting device L to emit light.

According to the pixel circuit provided by the embodiment of the present disclosure, by arranging the data write circuit, the driving control circuit, the light-emitting control circuit and the light-emitting device, the data write circuit provides the data signal of the data signal end for the driving control circuit in response to the signal of the first scanning signal end; the driving control circuit generates the driving current according to the data signal; and the light-emitting control circuit connects the driving control circuit with the cathode of the light-emitting device in response to the signal of the second scanning signal end, so that the driving current is input into the light-emitting device, and the light-emitting device is controlled to emit light. Besides, as the voltage of the first power end is larger than that of the second power end, the anode of the light-emitting diode is electrically connected with the first power end, thus enabling the inverted drive for the light-emitting device, and improving a light-emitting property.

In some embodiments, generally, the voltage Vdd of the first power end VDD is in a positive value, and the voltage Vss of the second power end VSS is grounded or in a negative value. During actual application, all the voltages need to be designed and determined according to actual application environments and will not be limited herein.

In some embodiments, the light-emitting device L may be at least one of OLED and QLED, which may emit light in the effect of the driving current. Generally, the light-emitting device L has a light-emitting threshold voltage, and emits light when voltages of two ends of the light-emitting device L are larger than or equal to the light-emitting threshold voltage.

Figure 2:
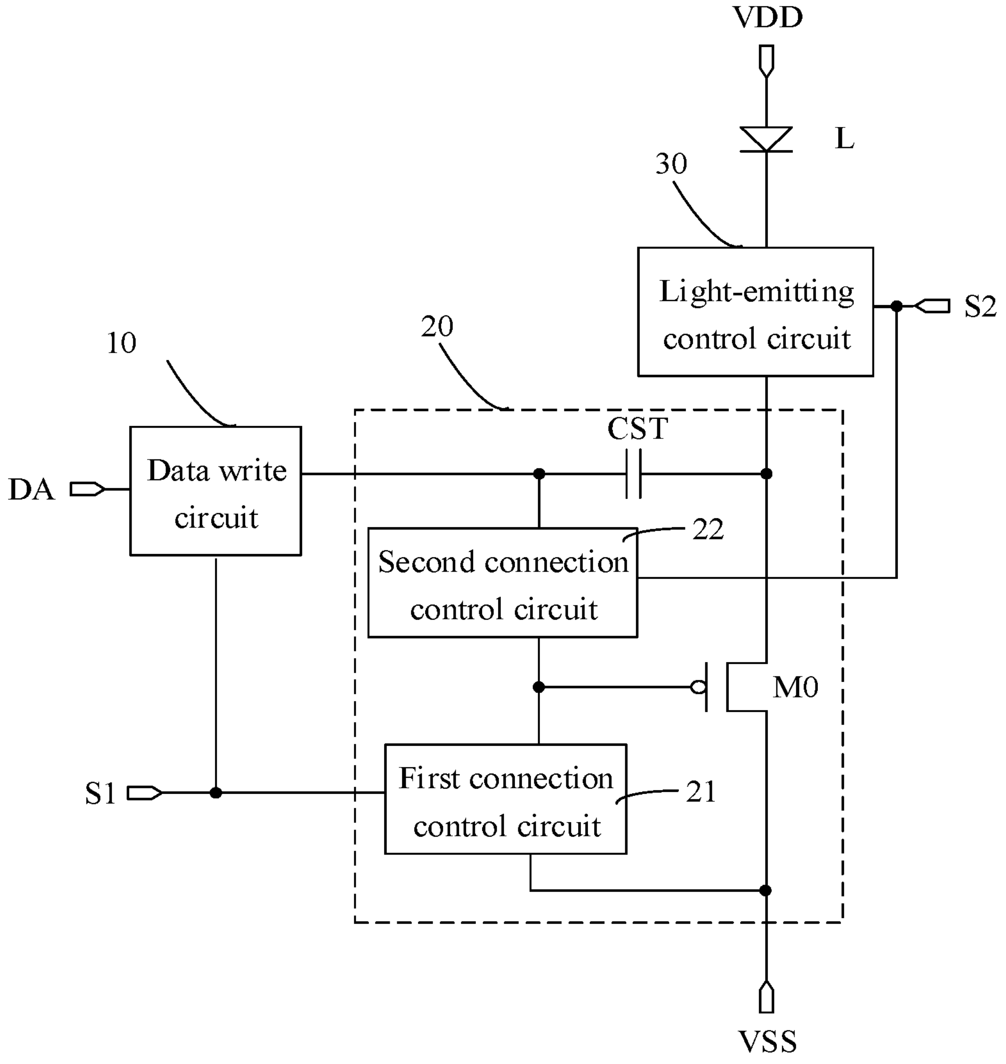
FIG. 2 is another schematic structural diagram of a pixel circuit in an embodiment of the present disclosure.

In some embodiments, as shown in FIG. 2, the driving control circuit 20 includes: a driving transistor M0, a storage capacitor CST, a first connection control circuit 21 and a second connection control circuit 22. Here, a first end of the driving transistor M0 is electrically connected with a first end of the storage capacitor CST and the light-emitting control circuit 30, and a second end of the driving transistor M0 is electrically connected with the second power end VSS; a second end of the storage capacitor CST is electrically connected with the data write circuit 10 and the second connection control circuit 22;

the first connection control circuit 21 is configured to connect a gate of the driving transistor M0 with the second power end VSS in response to the signal of the first scanning signal end S1; and the second connection control circuit 22 is configured to connect the gate of the driving transistor M0 with the second end of the storage capacitor CST in response to the signal of the second scanning signal end.

In some embodiments, as shown in FIG. 2, the driving transistor M0 is a P-type transistor, a first electrode of the driving transistor M0 is its source, and a second electrode of the driving transistor M0 is its drain. When the driving transistor M0 is in a saturated state, the generated driving current flows from the source of the driving transistor M0 to its drain.

Figure 3:
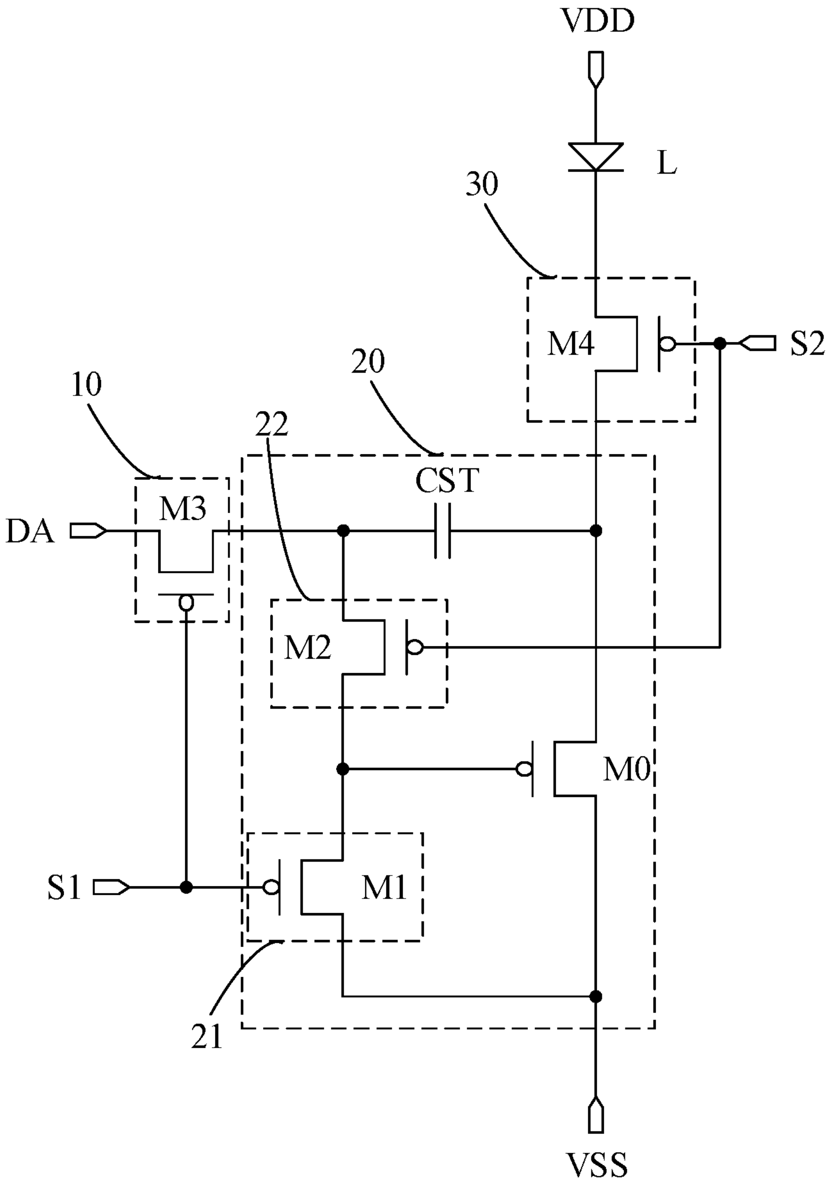
FIG. 3 is yet another schematic structural diagram of a pixel circuit in an embodiment of the present disclosure.

In some embodiments, as shown in FIG. 3, the first connection control circuit 21 includes: a first transistor M1. Here, a gate of the first transistor M1 is electrically connected with the first scanning signal end S1, a first electrode of the first transistor M1 is electrically connected with the second power end VSS, and a second electrode of the first transistor M1 is electrically connected with the gate of the driving transistor M0.

In some embodiments, as shown in FIG. 3, the second connection control circuit 22 includes: a second transistor M2. Here, a gate of the second transistor M2 is electrically connected with the second scanning signal end S2, a first electrode of the second transistor M2 is electrically connected with the gate of the driving transistor M0, and a second electrode of the second transistor M2 is electrically connected with the second end of the storage capacitor CST.

In some embodiments, as shown in FIG. 3, the data write circuit 10 includes: a third transistor M3. Here, a gate of the third transistor M3 is electrically connected with the first scanning signal end S1, a first electrode of the third transistor M3 is electrically connected with the data signal end DA, and a second electrode of the third transistor M3 is electrically connected with the driving control circuit 20. For example, the second electrode of the third transistor M3 is electrically connected with the second end of the storage capacitor CST.

In some embodiments, as shown in FIG. 3, the light-emitting control circuit 30 includes: a fourth transistor M4. Here, a gate of the fourth transistor M4 is electrically connected with the second scanning signal end S2, a first electrode of the fourth transistor M4 is electrically connected with the driving control circuit 20, and a second electrode of the fourth transistor M4 is electrically connected with the cathode of the light-emitting device L.

The description above only illustrates a specific structure of each module in the pixel circuit provided by the embodiment of the present disclosure. During specific implementation, a specific structure of each of the circuits is not limited to the above structure provided by the embodiment of the present disclosure, and may be other structures known by those skilled in the art, which is not limited herein.

Furthermore, in order to simplify a manufacturing process flow of the pixel circuit, in the pixel circuit provided by the embodiment of the present disclosure, as shown in FIG. 3, when the driving transistor M0 is the P-type transistor, the other transistors may be P-type transistors. Besides, the P-type transistor is turned off when a signal level is in a high level and turned on when a signal level is in a low level.

It should be noted that in the pixel circuit provided by the embodiment of the present disclosure, the transistor may be a Thin Film Transistor (TFT) or a Metal Oxide Semiconductor (MOS) field-effect tube and will not be limited herein. In some embodiments, according to difference of the types of the transistors and signals of the signal end, a first electrode of the transistor may serve as its source, and a second electrode of the transistor may serve as its drain; or the first electrode of the transistor may serve as its drain, and the second electrode of the transistor may serve as its source, which is not specifically distinguished herein.

Figure 4:
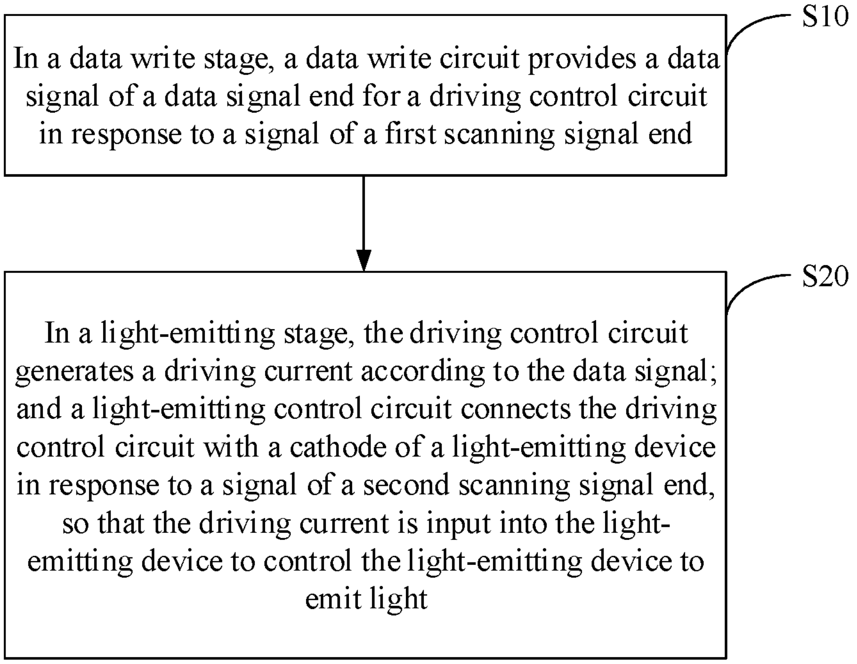
FIG. 4 is a flowchart of a driving method of a pixel circuit in an embodiment of the present disclosure.

An embodiment of the present disclosure further provides a driving method of the pixel circuit, as shown in FIG. 4, including as follows.

S10, in a data write stage, a data write circuit 10 provides a data signal of a data signal end DA for a driving control circuit 20 in response to a signal of a first scanning signal end S1.

S20, in a light-emitting stage, the driving control circuit 20 generates a driving current according to the data signal, a light-emitting control circuit 30 connects the driving control circuit 20 with a cathode of a light-emitting device L in response to a signal of a second scanning signal end S2, so that the driving current is input into the light-emitting device L to control the light-emitting device L to emit light.

During actual application, due to a fabrication process and device aging, a threshold voltage Vth of a driving transistor M0 driving the light-emitting device L to emit light is non-uniform, consequently a current flowing through each OLED changes, the display brightness is non-uniform, and a display effect of a whole image is affected. In some embodiments of the present application, when the driving control circuit 20 includes: the driving transistor M0, a storage capacitor CST, a first connection control circuit 21 and a second connection control circuit 22, the driving method further includes that: in the data write stage, the first connection control circuit 20 connects a gate of the driving transistor M0 with a second power end VSS in response to the signal of the first scanning signal end S1. In this way, threshold compensation may be achieved.

In some embodiments, when the driving control circuit 20 includes: the driving transistor M0, the storage capacitor CST, the first connection control circuit 21 and the second connection control circuit 22, the driving method further includes that: in the light-emitting stage, the second connection control circuit 22 connects with the gate of the driving transistor M0 with a second end of the storage capacitor CST in response to the signal of the second scanning signal end S2.

Taking the pixel circuit shown in FIG. 3 for example and in combination with a circuit sequence chart shown in FIG. 5, a working process of the pixel circuit provided by the embodiment of the present disclosure is described below. In the description below, "1" represents a high level, and "0" represents a low level. It should be noted that 1 and 0 are logic levels, only for better illustrating the specific working process of the embodiment of the present disclosure, but not a voltage applied to a control electrode of each transistor during specific implementation.

Figure 5:
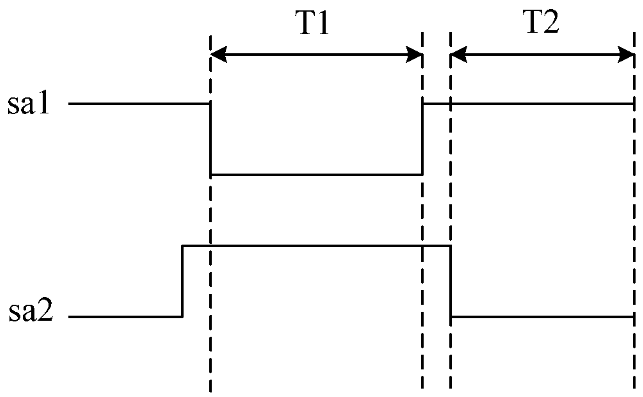
FIG. 5 is a signal sequence chart of a pixel circuit in an embodiment of the present disclosure.

Taking a data write stage T1 and a light-emitting stage T2 in FIG. 5 as an example, sa1 represents the signal of the first scanning signal end S1, and sa2 represents the signal of the second scanning signal end S2.

Figure 6A:
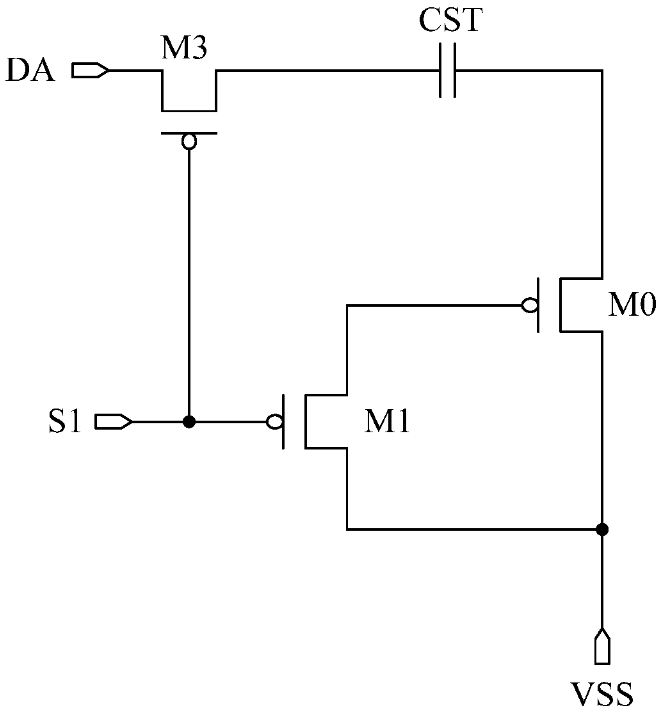
FIG. 6A is a schematic structural diagram of a transistor of a pixel circuit working in a data write stage in an embodiment of the present disclosure.

In combination with FIG. 3 and FIG. 6A, in the data write stage T1, both the second transistor M2 and the fourth transistor M4 may be turned off under control of the signal sa2 of the second scanning signal end S2 in a high level, and both the first transistor M1 and the third transistor M3 may be turned on under control of the signal sa1 of the first scanning signal end S1 in a low level. The conducting third transistor M3 may provide the data signal of the data signal end DA for the second end of the storage capacitor CST, so that a voltage Vda of the data signal may be stored through the storage capacitor CST. The conducting first transistor M1 connects the gate of the driving transistor M0 with the second power end VSS, so that the driving transistor M0 may be made to form a diode connection, and a voltage of the first end of the storage capacitor CST may become Vss+|Vth|.

Figure 6B:
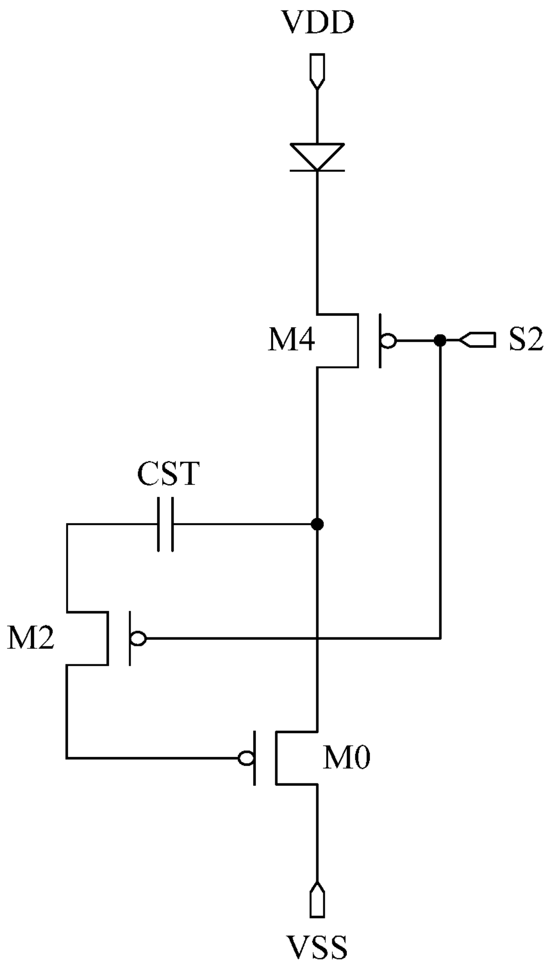
FIG. 6B is a schematic structural diagram of a transistor of a pixel circuit working in a light-emitting stage in an embodiment of the present disclosure.

In combination with FIG. 3 and FIG. 6B, in the light-emitting stage T2, both the first transistor M1 and the third transistor M3 may be turned off under control of the signal sa1 of the first scanning signal end S1 in a high level, and both the second transistor M2 and the fourth transistor M4 may be turned on under control of the signal sa2 of the second scanning signal end S2 in a low level. The conducting second transistor M2 may connect the gate of the driving transistor M0 with the second end of the storage capacitor CST, so that the voltage Vda stored at the second end of the storage capacitor CST may be transmitted to the gate of the driving transistor M0. Besides, a voltage of the first end of the driving transistor M0 is Vss+|Vth|, the driving current Ids generated by the driving transistor M0 meets the following formula: $Ids=K\ (Vda-Vss)^2$. Here, K is a structure parameter, is relatively stable in the same structure and may be constructed as a constant. The above formula shows that the driving current Ids generated by the driving transistor M0 is related only to the voltage Vss of the second power end VSS and the voltage Vda of the data signal end DA, but not related to the threshold voltage Vth of the driving transistor M0 and the voltage Vdd of the first power end VDD, which can avoid the influence on the driving current due to drifting of the threshold voltage Vth of the driving transistor M0 and IR Drop, keep the driving current of the light-emitting device L stable, and ensure the normal work of the light-emitting device L.

It should be noted that in combination with FIG. 5, a falling edge of the signal sa1 of the first scanning signal end S1 and a rising edge of the signal sa2 of the second scanning signal end S2 may be staggered or aligned.

It should be noted that in combination with FIG. 5, a rising edge of the signal sa1 of the first scanning signal end S1 and a falling edge of the signal sa2 of the second scanning signal end S2 may be staggered or aligned.

Figure 7:
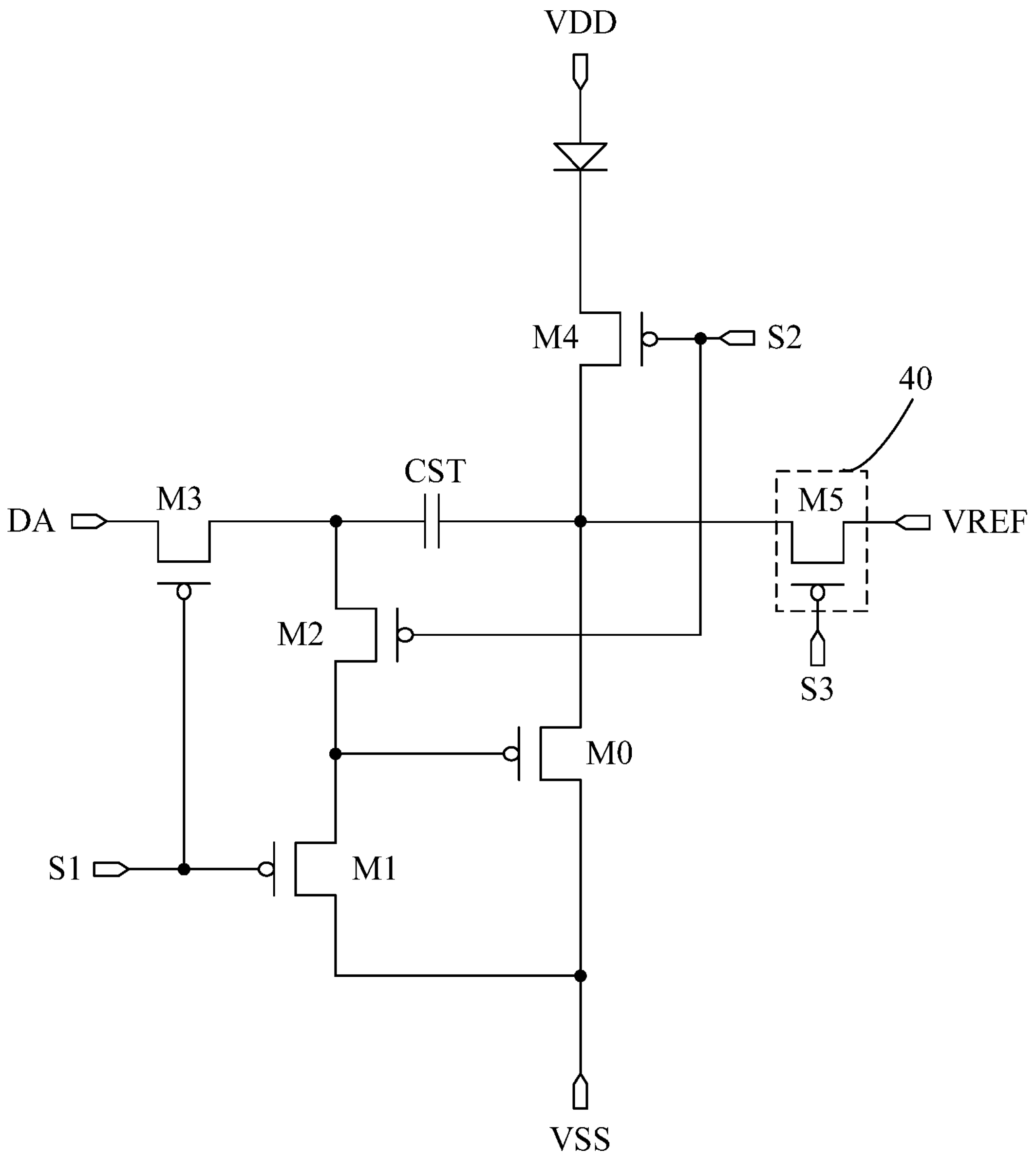
FIG. 7 is yet another schematic structural diagram of a pixel circuit in an embodiment of the present disclosure.

An embodiment of the present disclosure provides another pixel circuit, and its schematic structural diagram is shown in FIG. 7, which is transformed according to the implementations of the embodiment above. Description of only the difference between the embodiment and the above-mentioned embodiment is made below except for similarities.

In some embodiments, as shown in FIG. 7, the pixel circuit may further include: a reset circuit 40. Here, the reset circuit 40 is configured to provide a signal of a reference signal end VREF for the first end of a driving transistor M0 in response to a signal of a third scanning signal end S3. In some embodiments, the reset circuit 40 includes: a fifth transistor M5. A gate of the fifth transistor M5 is electrically connected with the third scanning signal end S3, a first electrode of the fifth transistor M5 is electrically connected with the reference signal end VREF, and a second electrode of the fifth transistor M5 is electrically connected with the first end of the driving transistor M0. In some embodiments, the fifth transistor M5 may also be a P-type transistor, which reduces the process difficulty.

When the pixel circuit further includes the reset circuit, before a data write stage, the driving method may further include: a reset stage. In the reset stage, the reset circuit provides the signal of the reference signal end VREF for the first end of the driving transistor M0 in response to the signal of the third scanning signal end S3. In this way, the first end of the driving transistor M0 may be reset through the signal of the reference signal end VREF.

In some embodiments, the reset stage may further include that: the data write circuit 10 provides the data signal of the data signal end DA for the driving control circuit 20 in response to the signal of the first scanning signal end S1, and the first connection control circuit 21 connects the gate of the driving transistor M0 with the second power end VSS in response to the signal of the first scanning signal end S1. Accordingly, the gate of the driving transistor M0 may be reset through the second power end VSS, and the data signal may be pre-charged through the data write circuit 10.

Taking the pixel circuit shown in FIG. 7 for example and in combination with a circuit sequence chart shown in FIG. 8, a working process of above-mentioned pixel circuit provided by the embodiment of the present disclosure is described below. In the description below, "1" represents a high level, and "0" represents a low level. It should be noted that 1 and 0 are logic levels, only for better illustrating the specific working process of the embodiment of the present disclosure, but not a voltage applied to a control electrode of each transistor during specific implementation.

Figure 8:
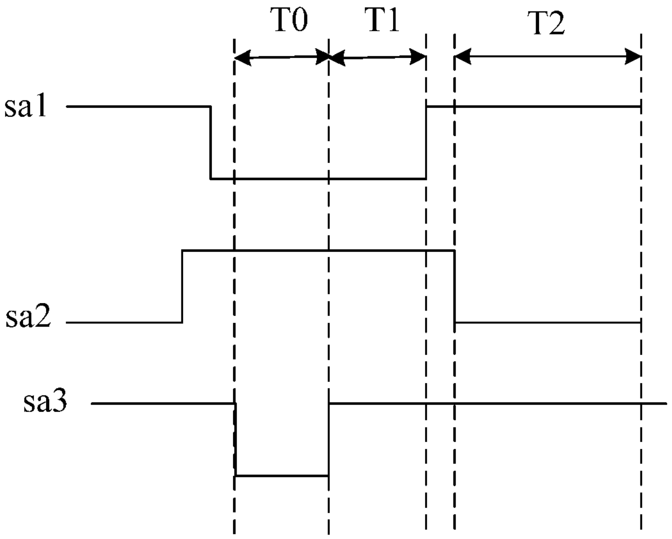
FIG. 8 is another signal sequence chart of a pixel circuit in an embodiment of the present disclosure.

Taking a reset stage T0, a data write stage T1 and a light-emitting stage T2 in FIG. 8 as an example, sa1 represents a signal of a first scanning signal end S1, sa2 represents a signal of a second scanning signal end S2, and sa3 represents a signal of a third scanning signal end S3.

Figure 9:
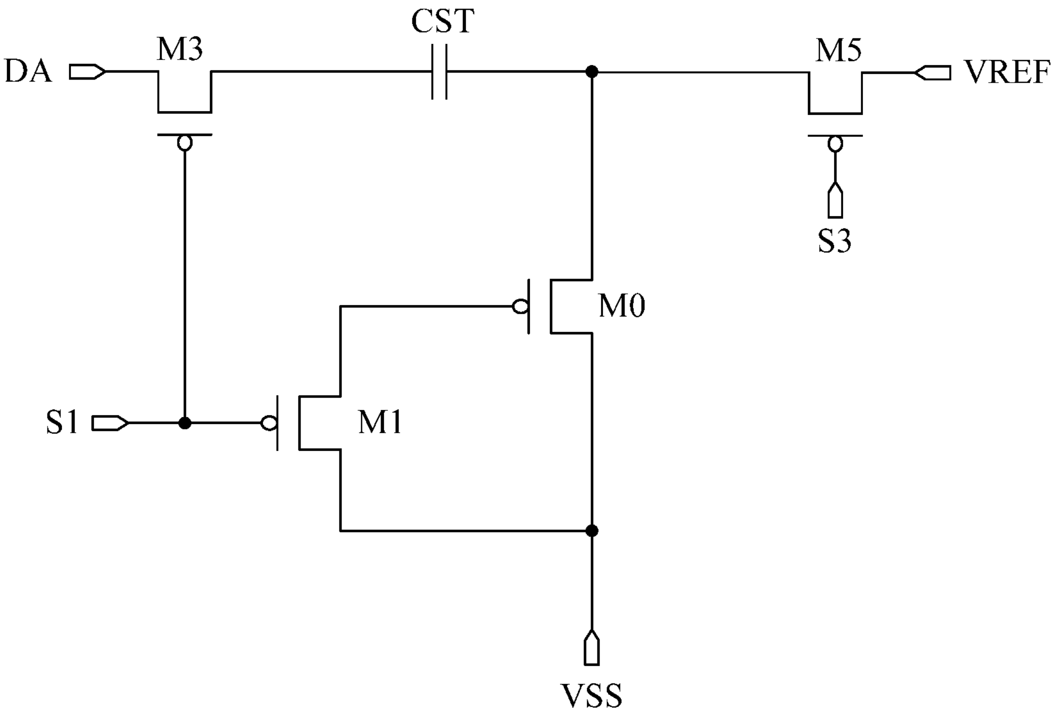
FIG. 9 is a schematic structural diagram of a transistor of a pixel circuit working in a reset stage in an embodiment of the present disclosure.

In combination with FIG. 9, in the reset stage T0, both the second transistor M2 and the fourth transistor M4 may be turned off under control of the signal sa2 of the second scanning signal end S2 in a high level, and the first transistor M5 may be turned on under control of the signal sa3 of the third scanning signal end S3 in a low level. The conducting fifth transistor M5 may provide the signal of the reference signal end VREF for the first end of the driving transistor M0, so that the first end of the driving transistor M0 may be reset through the signal of the reference signal end VREF. Besides, both the first transistor M1 and the third transistor M3 may be turned on under control of the signal sa1 of the first scanning signal end S1 in a low level. The conducting third transistor M3 may provide the data signal of the data signal end DA for the second end of the storage capacitor CST for pre-charging, and the voltage Vda of the data signal is stored through the storage capacitor CST. The conducting first transistor M1 may connect the gate of the driving transistor M0 with the second power end VSS, so that the gate of the driving transistor M0 may be reset through a voltage of the second power end VSS.

In combination with FIG. 6A, in the data write stage T1, both the second transistor M2 and the fourth transistor M4 may be turned off under control of the signal sa2 of the second scanning signal end S2 in a high level. Both the first transistor M1 and the third transistor M3 may be turned on under control of the signal sa1 of the first scanning signal end S1 in a low level. The conducting third transistor M3 may provide the data signal of the data signal end DA for the second end of the storage capacitor CST, so that the voltage Vda of the data signal is stored through the storage capacitor CST. The conducting first transistor M1 connects the gate of the driving transistor M0 with the second power end VSS, so that the driving transistor M0 may be made to form a diode connection, and a voltage of the first end of the storage capacitor CST may become Vss+|Vth|.

In combination with FIG. 6B, in the light-emitting stage T2, both the first transistor M1 and the third transistor M3 may be turned off under control of the signal sa1 of the first scanning signal end S1 in a high level, and both the second transistor M2 and the fourth transistor M4 may be turned on under control of the signal sa2 of the second scanning signal end S2 in a low level. The conducting second transistor M2 may connect the gate of the driving transistor M0 with the second end of the storage capacitor CST, so that the voltage Vda stored at the second end of the storage capacitor CST may be transmitted to the gate of the driving transistor M0. Besides, the voltage of the first end of the driving transistor M0 is Vss+|Vth|, a driving current Ids generated by the driving transistor M0 meets the following formula: Ids=K $(Vda-Vss)^2$. Here, K is a structure parameter, is relatively stable in the same structure, and may be constructed as a constant. The above formula shows that the driving current Ids generated by the driving transistor M0 is related only to the voltage VSS of the second power end VSS and the voltage Vda of the data signal end DA, but not related to the threshold voltage Vth of the driving transistor M0 and the voltage Vdd of the first power end VDD, which can avoid the influence on the driving current due to drifting of the threshold voltage Vth of the driving transistor M0 and IR Drop, keep the driving current of the light-emitting device L stable, and ensure the normal work of the light-emitting device L.

It should be noted that in combination with FIG. 8, a falling edge of the signal sa1 of the first scanning signal end S1, a rising edge of the signal sa2 of the second scanning signal end S2 and a falling edge of the signal sa3 of the third scanning signal end S3 may be staggered. Alternatively, the falling edge of the signal sa1 of the first scanning signal end S1, the rising edge of the signal sa2 of the second scanning signal end S2 and the falling edge of the signal sa3 of the third scanning signal end S3 may be aligned.

It should be noted that in combination with FIG. 8, a rising edge of the signal sa1 of the first scanning signal end S1, a falling edge of the signal sa2 of the second scanning signal end S2 and a rising edge of the signal sa3 of the third scanning signal end S3 may be staggered. Alternatively, the rising edge of the signal sa1 of the first scanning signal end S1, the falling edge of the signal sa2 of the second scanning signal end S2 and the rising edge of the signal sa3 of the third scanning signal end S3 may be aligned.

Based on the same inventive concept, an embodiment of the present disclosure further provides a display device, including the above-mentioned pixel circuit provided by the embodiment of the present disclosure. A principle of solving the problem of the display device is similar to that of the pixel circuit, and thus implementation of the display device may refer to implementation of the pixel circuit, and repetition is omitted herein.

During specific implementation, in the embodiment of the present disclosure, the display device may be: a mobile phone, a tablet PC, a television, a display, a laptop, a digital photo frame, a navigator and any other product or part with a display function. Other necessary components of the display device should be understood by those ordinarily skilled in the art and will neither be described herein nor limit the present disclosure.

During specific implementation, in the embodiment of the present disclosure, the display device may include: a plurality of pixel units distributed in an array mode in a display region. Each of the pixel unit includes a plurality of sub-pixels. Illustratively, the pixel unit may include red sub-pixels, green sub-pixels and blue sub-pixels, and thus color mixing may be performed with red, green and blue to realize color display. Alternatively, the pixel unit may include the red sub-pixels, the green sub-pixels, the blue sub-pixels and white sub-pixels, and thus color mixing may be performed with red, green, blue and white to realize color display. Certainly, during actual application, light-emitting colors of the sub-pixels in the pixel units may be designed and determined according to the actual application environment and will not be limited herein.

Figure 10:
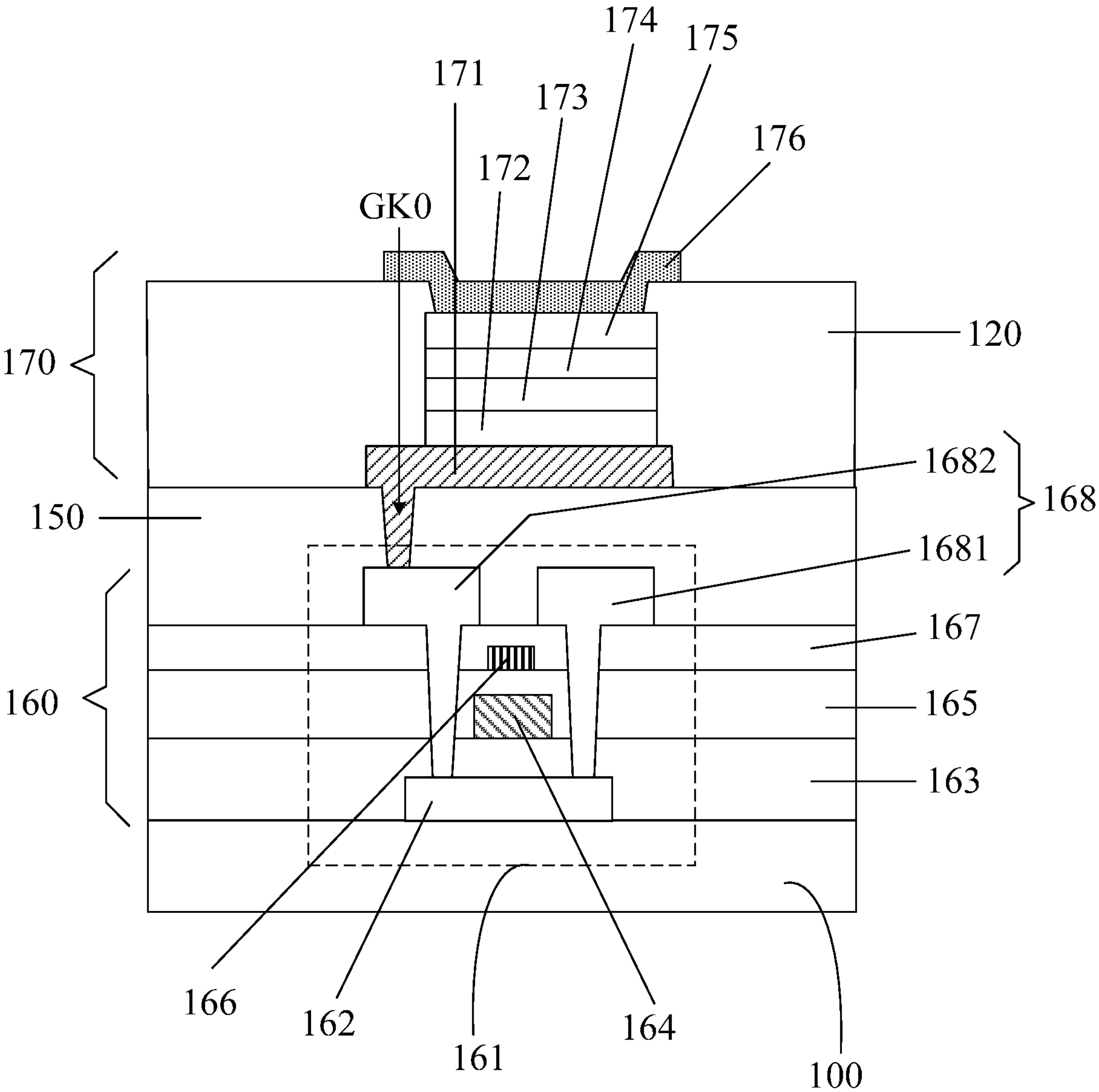
FIG. 10 is a schematic diagram of a partial structure of a display device in an embodiment of the present disclosure.

In some embodiments, the light-emitting device in the pixel circuit provided by the embodiment of the present disclosure may be of an inverted structure. When the pixel circuit is applied to the display device, one pixel circuit may be arranged for one sub-pixel. As shown in FIG. 10, taking one transistor 161 (e.g., the fourth transistor M4) in the pixel circuit for example, the display device may include a transistor array layer 160, a planarization layer 150 located on one side, facing away from a base substrate 100, of the transistor array layer 160, and a layer 170 with the light-emitting device located on one side, facing away from the base substrate 100, of the planarization layer 150.

In some embodiments, as shown in FIG. 10, the transistor array layer 160 may include a plurality of thin film transistors 161 arranged at intervals, so that the transistors and a storage capacitor in the pixel circuit may be formed in the transistor array layer. Besides, each of the thin film transistors 161 may include: an active layer 162 located on one side of the base substrate 100, a gate insulation layer 163 located on one side, facing away from the base substrate 100, of the active layer 162, a gate 164 located on one side, facing away from the base substrate 100, of the gate insulation layer 163, an interlayer dielectric layer 165 located on one side, facing away from the base substrate 100, of the gate 164, a capacitor electrode layer 166 located on one side, facing away from the base substrate 100, of the interlayer dielectric layer 165, an interlayer insulation layer 167 located on one side, facing away from the base substrate 100, of the capacitor electrode layer 166, and a source-drain layer 168 located on one side, facing away from the base substrate 100, of the interlayer insulation layer 167. A source 1681 in the source-drain layer 168 is electrically connected with the other corresponding transistor; the source 1681 and a drain 1682 are further electrically connected with the active layer 162 through vias penetrating through the gate insulation layer 163, the interlayer dielectric layer 165 and the interlayer insulation layer 167 respectively. Besides, an orthographic projection of the capacitor electrode layer 166 on the base substrate 100 and an orthographic projection of the gate 164 on the base substrate 100 have an overlapping region, so that the capacitor electrode layer 166 and the gate 164 may form the storage capacitor.

In some embodiments, as shown in FIG. 10, the layer 170 with the light-emitting device may include a light-emitting device. The light-emitting device may include: a cathode 171 located on one side, facing away from the base substrate 100, of the planarization layer 150, an electron transport layer 172 located on one side, facing away from the base substrate 100, of the cathode 171, a light-emitting layer 173 located on one side, facing away from the base substrate 100, of the electron transport layer 172, a hole transport layer 174 located on one side, facing away from the base substrate 100, of the light-emitting layer 173, a hole injection layer 175 located on one side, facing away from the base substrate 100, of the hole transport layer 174, and an anode 176 located on one side, facing away from the base substrate 100, of the hole injection layer 175. Besides, the drain 1682 is electrically connected with the corresponding cathode 171 through a via GK0 penetrating through the planarization layer 150.

In some embodiments, as for a quantum dot light-emitting diode, the light-emitting layer may be a quantum dot light-emitting layer. Namely, a material of the light-emitting layer is a quantum dot electroluminescent material.

In some embodiments, as for an organic light-emitting diode, the light-emitting layer may be an organic light-emitting layer. Namely, the material of the light-emitting layer may be an organic electroluminescent material.

According to the pixel circuit, the driving method thereof and the display device provided by the embodiment of the present disclosure, by arranging the data write circuit, the driving control circuit, the light-emitting control circuit and the light-emitting device, the data write circuit provides the data signal of the data signal end for the driving control circuit in response to the signal of the first scanning signal end; the driving control circuit generates the driving current according to the data signal; and the light-emitting control circuit connects the driving control circuit with the cathode of the light-emitting device in response to the signal of the second scanning signal end, so that the driving current is input into the light-emitting device, and the light-emitting device is controlled to emit light. Besides, as the voltage of the first power end is larger than that of the second power end, so that the anode of the light-emitting device can be electrically connected with the first power end, the inverted driven light-emitting device is achieved, and the light-emitting property can be improved.

Apparently, those skilled in the art may make various changes and transformations without departing from the spirit and scope of the present disclosure. In this case, if these changes and transformations of the present disclosure belong to the scope of claims and their equivalents, the present disclosure also intends to include these changes and transformations.

What is claimed is:

1. A pixel circuit, comprising: a data write circuit, a driving control circuit, a light-emitting control circuit and a light-emitting device, wherein an anode of the light-emitting device is directly and electrically connected with a first power end, and a cathode of the light-emitting device is indirectly and electrically connected with a second power end through the light-emitting control circuit and the driving control circuit in sequence; a voltage of the first power end is larger than a voltage of the second power end;

the data write circuit is configured to provide a data signal of a data signal end for the driving control circuit in response to a signal of a first scanning signal end;

the driving control circuit is configured to generate a driving current according to the data signal; and the light-emitting control circuit is configured to connect the driving control circuit with the cathode of the light-emitting device in response to a signal of a second scanning signal end, so that the driving current is input into the light-emitting device to control the light-emitting device to emit light;

wherein the driving control circuit comprises: a driving transistor, a storage capacitor, a first connection control circuit and a second connection control circuit, and wherein a first end of the driving transistor is electrically connected with a first end of the storage capacitor and the light-emitting control circuit, and a second end of the driving transistor is directly and electrically connected with the second power end;

a second end of the storage capacitor is electrically connected with the data write circuit and the second connection control circuit;

the first connection control circuit is configured to connect a gate of the driving transistor with the second power end in response to the signal of the first scanning signal end; and the second connection control circuit is configured to connect the gate of the driving transistor with the second end of the storage capacitor in response to the signal of the second scanning signal end;

wherein the first connection control circuit comprises: a first transistor, and wherein a gate of the first transistor is electrically connected with the first scanning signal end, a first electrode of the first transistor is directly and electrically connected with the second power end, and a second electrode of the first transistor is electrically connected with the gate of the driving transistor;

wherein the light-emitting control circuit comprises: a fourth transistor, and wherein a gate of the fourth transistor is electrically connected with the second scanning signal end, a first electrode of the fourth transistor is electrically connected with the driving control circuit, and a second electrode of the fourth transistor is directly and electrically connected with the cathode of the light-emitting device;

wherein the driving current generated by the driving control circuit meets following formula:

$$Ids=K(Vda-Vss)^2$$

wherein, Ids represents the driving current, K is a structure parameter, Vss represents the voltage of the second power end, and Vda represents a voltage of the data signal end.

2. The pixel circuit of claim 1, wherein the second connection control circuit comprises: a second transistor, and wherein a gate of the second transistor is electrically connected with the second scanning signal end, a first electrode of the second transistor is electrically connected with the gate of the driving transistor, and a second electrode of the second transistor is electrically connected with the second end of the storage capacitor.

3. The pixel circuit of claim 1, wherein the data write circuit comprises: a third transistor, and wherein a gate of the third transistor is electrically connected with the first scanning signal end, a first electrode of the third transistor is electrically connected with the data signal end, and a second electrode of the third transistor is electrically connected with the driving control circuit.

4. The pixel circuit of claim 1, further comprising: a reset circuit, wherein the reset circuit is configured to provide a signal of a reference signal end for a first end of a driving transistor in response to a signal of a third scanning signal end.

5. The pixel circuit of claim 4, wherein the reset circuit comprises: a fifth transistor, wherein a gate of the fifth transistor is electrically connected with the third scanning signal end, a first electrode of the fifth transistor is electrically connected with the reference signal end, and a second electrode of the fifth transistor is electrically connected with the first end of the driving transistor.

6. The pixel circuit of claim 1, wherein the light-emitting device is at least one of a quantum dot light-emitting diode and an organic light-emitting diode.

7. A display device, comprising the pixel circuit of claim 1.

8. A driving method of the pixel circuit of claim 1, comprising a data write stage and a light-emitting stage, wherein:

in the data write stage, the data write circuit provides a data signal of a data signal end for the driving control circuit in response to a signal of a first scanning signal end; and in the light-emitting stage, the driving control circuit generates a driving current according to the data signal; and the light-emitting control circuit connects the driving control circuit with a cathode of the light-emitting device in response to a signal of a second scanning signal end, so that the driving current is input into the light-emitting device to control the light-emitting device to emit light.

9. The driving method of claim 8, wherein the driving control circuit comprises: a driving transistor, a storage capacitor, a first connection control circuit and a second connection control circuit, and the driving method further comprises:

in the data write stage, the first connection control circuit connecting a gate of the driving transistor with a second power end in response to the signal of the first scanning signal end; and in the light-emitting stage, the second connection control circuit connecting with the gate of the driving transistor with a second end of the storage capacitor in response to the signal of the second scanning signal end.

10. The driving method of claim 9, wherein the pixel circuit further comprises a reset circuit, and wherein before the data write stage, the driving method further comprises: a reset stage; and in the reset stage, the reset circuit provides a signal of a reference signal end for a first end of the driving transistor in response to a signal of a third scanning signal end.

11. The driving method of claim 10, further comprising:

in the reset stage, the data write circuit providing the data signal of the data signal end for the driving control circuit in response to the signal of the first scanning signal end; and the first connection control circuit connects the gate of the driving transistor with the second power end in response to the signal of the first scanning signal end.

12. The pixel circuit of claim 1, wherein all transistors in the data write circuit, the driving control circuit, and the light-emitting control circuit are P-type transistors.

* * * * *